US008855834B2

(12) United States Patent
Zeng et al.

(10) Patent No.: US 8,855,834 B2
(45) Date of Patent: Oct. 7, 2014

(54) SENSING SYSTEM FOR FOLLOWING A STRINGLINE

(75) Inventors: Jack Zeng, Eden Prairie, MN (US); Michael R. Olson, Brooklyn Park, MN (US)

(73) Assignee: Sauer-Danfoss Inc., Ames, IA (US)

( * ) Notice: Subject to any disclaimer, the term of this patent is extended or adjusted under 35 U.S.C. 154(b) by 119 days.

(21) Appl. No.: 13/280,526

(22) Filed: Oct. 25, 2011

(65) Prior Publication Data

US 2013/0103231 A1    Apr. 25, 2013

(51) Int. Cl.
| G06F 7/00 | (2006.01) |
| G01S 13/87 | (2006.01) |
| E01C 19/00 | (2006.01) |
| G01S 1/02 | (2010.01) |
| B60W 30/10 | (2006.01) |

(52) U.S. Cl.
CPC .............. B60W 30/10 (2013.01); G01S 13/876 (2013.01); *B60Y 2410/111* (2013.01); E01C 19/00 (2013.01); G01S 1/02 (2013.01)
USPC ............................................................ 701/2

(58) Field of Classification Search
CPC ............ G06F 7/00; G07C 5/008; B60R 25/24
USPC ............................................................ 701/2
See application file for complete search history.

(56) References Cited

U.S. PATENT DOCUMENTS

| 5,412,708 | A | 5/1995 | Katz |
| 6,728,296 | B1 | 4/2004 | Yung |
| 7,492,254 | B2 | 2/2009 | Bandy et al. |
| 7,978,065 | B2 * | 7/2011 | Schnitz et al. ........... 340/539.13 |
| 2001/0027360 | A1 * | 10/2001 | Nakano et al. .................. 701/23 |
| 2004/0246100 | A1 * | 12/2004 | Kranz .......................... 340/10.1 |
| 2008/0073431 | A1 | 3/2008 | Davis |
| 2008/0253834 | A1 * | 10/2008 | Colvard .................... 404/84.05 |
| 2010/0057361 | A1 | 3/2010 | Caveney et al. |

FOREIGN PATENT DOCUMENTS

| EP | 1873052 | 6/2009 |
| WO | 2005043446 | 5/2005 |
| WO | 2006102637 | 9/2006 |
| WO | 2008033981 | 3/2008 |
| WO | 2008039798 | 4/2008 |
| WO | 2009138955 | 11/2009 |
| WO | 2010080470 | 7/2010 |
| WO | 2011056269 | 5/2011 |

* cited by examiner

*Primary Examiner* — Fadey Jabr
*Assistant Examiner* — Yazan A Soofi
(74) *Attorney, Agent, or Firm* — Zarley Law Firm, P.L.C.

(57) ABSTRACT

A sensing system for providing string line vehicle automation. The system includes a master controller that is electrically connected to a receiver that has a transceiver that provides over-the-air communication to a plurality of sensors that are aligned along a string line. The transceivers receive information from the plurality of sensors in order to automate the control of the vehicle to ensure the vehicle drives in a straight line.

12 Claims, 3 Drawing Sheets

SENSING SYSTEM FOR FOLLOWING A STRINGLINE

BACKGROUND OF THE INVENTION

This invention relates to a sensing system for following a string line. More specifically, this invention relates to a wireless mechanical string line following system for construction equipment.

Often there is importance in having construction machines such as road paving machines be able to drive in a straight line and at a predetermined elevation. Currently string line sensors are placed far away from the body of the construction machine in close proximity to people and other moving construction moving vehicles. The cables for the string line sensors and the connector on the sensors themselves often get damaged because of the close proximity of traffic on a busy construction site. The sensor cables must be connected to the control system on the body of the machine which can be up to 30 feet away which exposes the cables to further damage.

Thus, a need in the art exists for a way to eliminate these physical cables but still be able to accurately navigate the machines. Such elimination of cables would similarly minimize the risk of shutting down machine operation because of damage to such cable. In addition, eliminating the cable would provide additional safety for such road construction workers.

Thus, a principal object of the present invention is to provide a sensing system for following a string line utilizing wireless technologies.

Yet another object of the present invention is to eliminate risks associated with cables.

These and other objects, features, and advantages will become apparent from the specification and claims.

BRIEF SUMMARY OF THE INVENTION

A sensing system for following a string line that includes a master controller and at least one receiver having a first transceiver in electric communication with the master controller. A plurality of wireless sensors that are aligned along a string line are each in over-the-air communication with the first transceiver of the receiver in order to communicate data from the sensors to the first transceiver.

DETAILED DESCRIPTION OF THE PREFERRED EMBODIMENT

Figure 1:
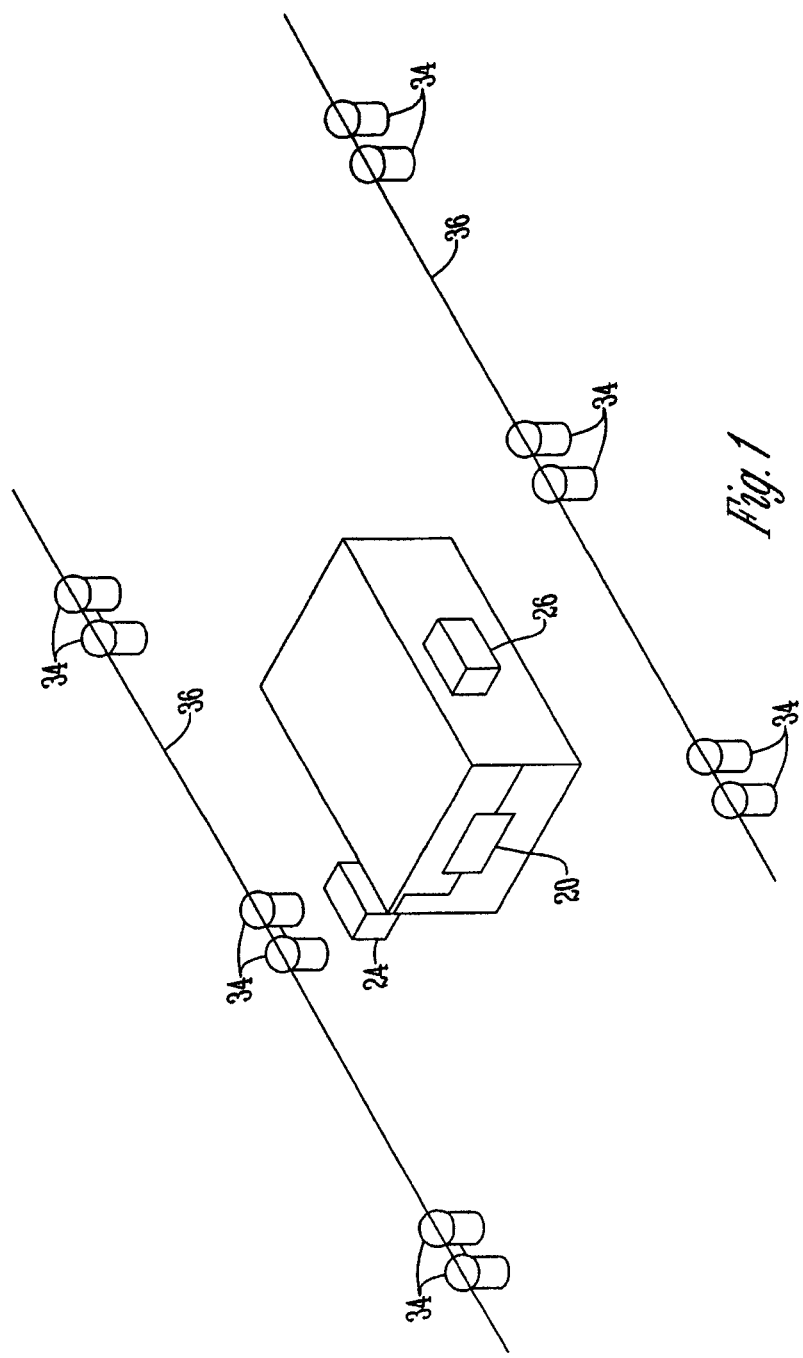
FIG. 1 is a top schematic diagram of a sensing system.

The figures show a sensing system 10 that includes a vehicle 12 that has a steering device 14 and optionally an elevation device 16 and associated valving 18. The vehicle 12 in a preferred embodiment is a construction vehicle such as a paving machine, a skid steer loader, or the like. A master controller 20 associated with the vehicle 12 by either being in the vehicle, on the vehicle, or the like electrically controls the valving 18 and thus the steering device and elevation device 14 and 16 for automated control of the vehicle 12. The master controller 20 additionally has a user interface 22 that allows for manual operation of functions of the system 10.

First and second receivers 24 and 26 are electrically connected and in communication with the master controller 22 via a CAN bus 28 to provide CAN messaging between the receivers 24, 26 and master controller 20. Each receiver 24, 26 has first and second transceivers 30 and 32 that in a preferred embodiment are 802.15.4 wireless radio links for bi-directional communication. By having two transceivers the sensor system band width is increased and additionally allows for active scanning of radio channel activity.

A plurality of wireless sensors 34 are aligned along a string line 36 to ensure the sensors 34 are aligned. Each of the plurality of wireless sensors 34 has a wand or transceiver 38 that is preferably 802.15.4 wireless radio link. In this manner the transceiver 38 is in over-the-air communication with a transceiver 30 or 32 of the receivers 24 or 26. In addition the plurality of wireless sensors 34 each have a RFID reader 40 that is able to read an RFID tag 42 located on a mounting bracket 44 of a sensor 34 in order to uniquely identify the sensor to the master controller 20.

Figure 2:
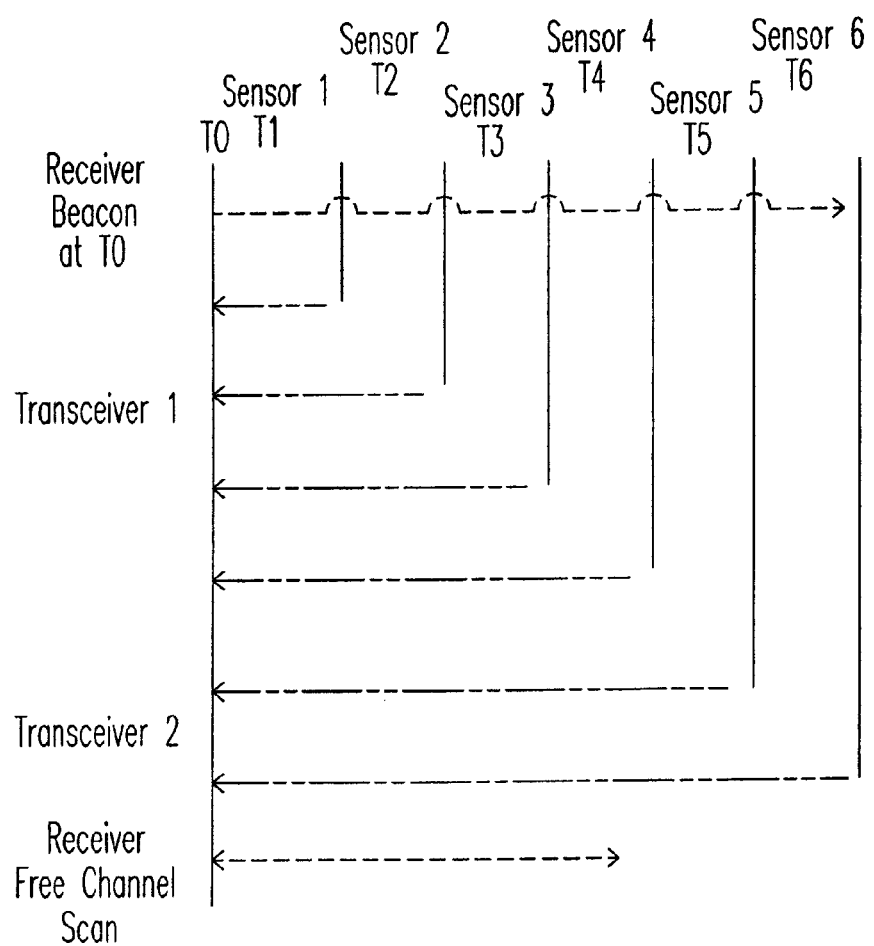
FIG. 2 is a protocol timing graph showing the movement of radio frequencies to and from transceivers of a receiver.
Figure 3:
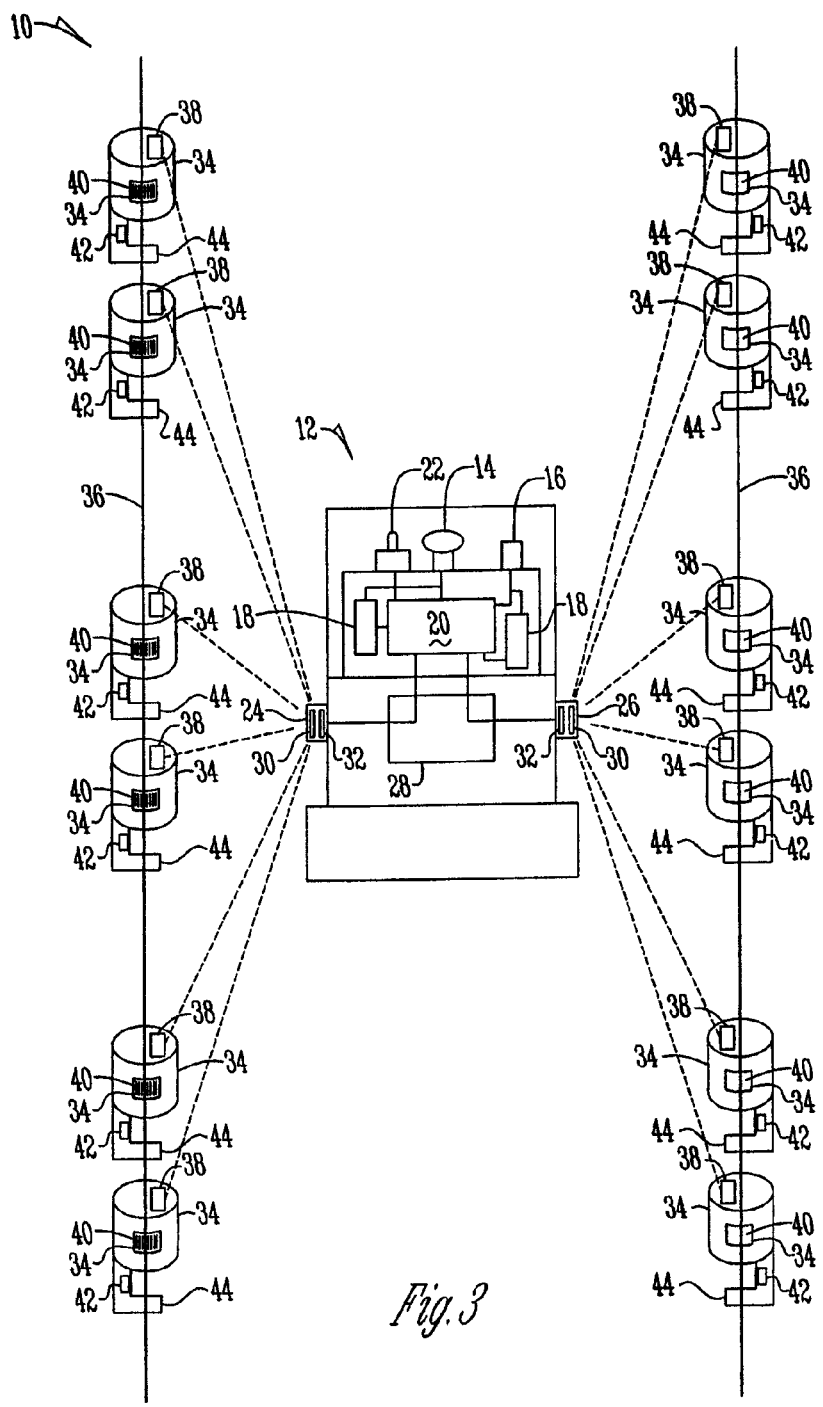
FIG. 3 is a schematic diagram of a sensing system for following a string line.

In operation, the first transceiver 30 of the first and second receivers 24, 26 transmits a time triggered protocol beacon at time=zero, T0, as shown in FIG. 2. Each of the plurality of sensors 34 responds with its positioning and status data in its respective time slot. Simultaneously the second transceiver 32 of the receivers 24, 26 collects wireless sensor data and scans all radio channels and determines the channel with the least amount of traffic available. At this time the receivers 24, 26 communicate with the plurality of sensors 34 to proactively command the sensors 34 to change to the radio channel with the least amount of traffic. The receivers 24, 26 also sort the sensor data into a CAN message 28 that is then transmitted over a machine control CAN bus to the master controller 20. Based on this communicated data the master controller 20 then selectively actuates the valving 18 of the vehicle 12 in order to control the steering device and elevation device 14, 16 to thus control the steering and elevation of the vehicle 12. Simultaneously the master controller 20 polls the receiver status, all sensors status, and can manually set the channels through the user interface 22.

Thus provided is a sensing system 10 that can be utilized in order to control the elevation and steering for a vehicle 12 such as a road construction machine for road paving. The transceivers 36 or wands attached to the plurality of sensors 34 sense the machine or vehicle 12 position versus the string line 36 position to provide control input to the elevation or steering control loop of the vehicle 12.

Thus, wireless mechanical string line wand sensors are provided. The multiple wireless sensors 34 can be read by the receivers 24, 26 at a very high data rate through the time triggered custom wireless protocol. Additionally, provided is the ability to actively switch to low traffic channels in a direct sequence spread spectrum (DSSS) and the use of an RFID reader 40 in order to read the RFID tag 42 to provide for automated machine sensor location. Thus, at the very least all of the stated objectives have been met.

It will be appreciated by those skilled in the art that other various modifications could be made to the device without departing from the spirit and scope of this invention. All such modifications and changes fall within the scope of the claims and are intended to be covered thereby.

What is claimed is:
1. A sensing system for following a string line comprising:
a master controller;
a first receiver having a first transceiver in electric communication with the master controller and a second receiver having a second transceiver in electric communication with the master controller;

a plurality of wireless sensors aligned along a string line in over-the-air communication with the first and second transceivers to communicate information to the first and second transceivers; and wherein the second transceiver proactively scans a range of radio channels, determines a channel with an acceptable amount of traffic and proactively commands the plurality of sensors to change to the radio channel with the acceptable amount of traffic.

2. The sensing system of claim 1 wherein the first transceiver is a wireless radio link.

3. The sensing system of claim 1 wherein each of the plurality of sensors has a transceiver that communicates the information over a radio channel to the first transceiver of the receiver.

4. The sensing system of claim 1 wherein at least one of the plurality of wireless sensors has an RFID reader.

5. The sensing system of claim 1 wherein the receiver transmits a time triggered beacon to the plurality of sensors.

6. The sensing system of claim 5 wherein the plurality of sensors communicate the information in response to receiving the time triggered beacon.

7. The sensing system of claim 1 wherein the first receiver communicates the information communicated to the first transceiver to the master controller.

8. The sensing system of claim 7 wherein the master controller steers a vehicle in response to the information communicated to the master controller.

9. The sensing system of claim 8 wherein the vehicle is a road paving machine.

10. A sensing system for following a string line comprising:
a master controller;
a first receiver having a first transceiver in electric communication with the master controller and a second receiver having a second transceiver in electric communication with the master controller; and
a plurality of wireless sensors aligned along a string line each in over-the-air communication with the first transceiver of the receiver to communicate information to the first transceiver wherein the plurality of wireless sensors have a RFID reader that is able to read an RFID tag located on a mounting bracket;

wherein the second transceiver proactively scans a range of radio channels, determines a channel with an acceptable amount of traffic and proactively commands the plurality of sensors to change to the radio channel with the acceptable amount of traffic.

11. The sensing system of claim 10 wherein the RFID tag of the mount bracket sensor uniquely identifies the wireless sensor connected to the mounting bracket.

12. A sensing system for following a string line comprising: a master controller attached to a vehicle; a first transceiver in electric communication with the master controller and a second receiver having a second transceiver in electric communication with the master controller; and
a plurality of wireless sensors aligned along a string line each in over-the-air communication with the first transceiver of the receiver to communicate information to the first transceiver wherein the plurality of wireless sensors are remote and detached from the vehicle;

wherein the second transceiver proactively scans a range of radio channels, determines a channel with an acceptable amount of traffic and proactively commands the plurality of sensors to change to the radio channel with the acceptable amount of traffic.

* * * * *